United States Patent
Lee et al.

(10) Patent No.: US 7,410,133 B2
(45) Date of Patent: Aug. 12, 2008

(54) MINIATURE TRAILING EDGE EFFECTOR FOR AERODYNAMIC CONTROL

(75) Inventors: Hak-Tae Lee, San Jose, CA (US); Stefan R. Bieniawski, Seattle, WA (US); Ilan M. Kroo, Stanford, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 11/646,186

(22) Filed: Dec. 27, 2006

(65) Prior Publication Data
US 2007/0221789 A1    Sep. 27, 2007

Related U.S. Application Data

(63) Continuation of application No. 11/445,086, filed on May 31, 2006, now abandoned.

(60) Provisional application No. 60/685,942, filed on May 31, 2005.

(51) Int. Cl.
*B64C 3/50* (2006.01)
*B64C 3/58* (2006.01)
*B64C 9/00* (2006.01)

(52) U.S. Cl. .............. 244/215; 244/35 R; 244/198; 244/204; 244/213; 244/225; 244/89; 244/90 R; 244/90 A; 244/194; 244/130; 244/99.4

(58) Field of Classification Search ............ 244/198, 244/201, 204, 206, 212–217, 199.1–199.4, 244/35 R, 34 R, 130, 194, 225, 89, 90 R, 244/90 A, 99.11–99.14
See application file for complete search history.

(56) References Cited

U.S. PATENT DOCUMENTS

| | | | | |
|---|---|---|---|---|
| 2,043,275 | A * | 6/1936 | Weick | 244/216 |
| 3,831,885 | A * | 8/1974 | Kasper | 244/199.1 |
| 5,265,830 | A * | 11/1993 | Allen | 244/213 |
| 5,564,656 | A * | 10/1996 | Gilbert | 244/217 |
| 6,565,045 | B1 * | 5/2003 | Correge et al. | 244/215 |
| 6,641,089 | B2 | 11/2003 | Schwetzler et al. | |
| 6,648,599 | B2 * | 11/2003 | Preissler | 416/1 |
| 6,739,550 | B2 * | 5/2004 | Koizumi et al. | 244/99.4 |
| 7,028,954 | B2 | 4/2006 | Van Dam et al. | |
| 7,070,144 | B1 * | 7/2006 | DiCocco et al. | 244/3.21 |

FOREIGN PATENT DOCUMENTS

JP      04078697 A *    3/1992

* cited by examiner

*Primary Examiner*—Rob Swiatek
*Assistant Examiner*—Joshua J Michener
(74) *Attorney, Agent, or Firm*—Lumen Patent Firm, Inc.

(57) ABSTRACT

Improved miniature trailing edge effectors for aerodynamic control are provided. Three types of devices having aerodynamic housings integrated to the trailing edge of an aerodynamic shape are presented, which vary in details of how the control surface can move. A bucket type device has a control surface which is the back part of a C-shaped member having two arms connected by the back section. The C-shaped section is attached to a housing at the ends of the arms, and is rotatable about an axis parallel to the wing trailing edge to provide up, down and neutral states. A flip-up type device has a control surface which rotates about an axis parallel to the wing trailing edge to provide up, down, neutral and brake states. A rotating type device has a control surface which rotates about an axis parallel to the chord line to provide up, down and neutral states.

8 Claims, 9 Drawing Sheets

(a)

(b)

MINIATURE TRAILING EDGE EFFECTOR FOR AERODYNAMIC CONTROL

CROSS-REFERENCE TO RELATED APPLICATIONS

This application is a continuation application of U.S. patent application Ser. 11/445,086 filed on May 31, 2006 now abandoned, entitled "Miniature Trailing Edge Effectors for Aerodynamic Control", which claims the benefit from U.S. Provisional Patent Application 60/685,942, filed on May 31, 2005, entitled "Miniature Trailing Edge Effectors for Aerodynamic Control".

STATEMENT REGARDING FEDERALLY SPONSORED RESEARCH OR DEVELOPMENT

This invention was made with Government support under contract F49620-98-1-0299 from the air force and under contract NN104AA79G from NASA. The government has certain rights in this invention.

FIELD OF THE INVENTION

The invention relates generally to miniature aerodynamic effectors. More particularly, the invention relates to miniature aerodynamic effectors that operate at high frequency and low power.

BACKGROUND

Many different flap arrangements for changing the aerodynamic lift generated by an aerodynamic element of an aircraft are known. For example, the Gurney flap originally developed and applied to racing cars by Robert Liebeck and Dan Gurney, protrude vertically into the air flow and cause a stable separation region to form, changing the sectional lift and moment comparable to a traditional flap of much larger size. Gurney flaps have been the inspiration to many aerodynamic control devices. Van Dam, et al. (U.S. Pat. No. 7,028,954) teach micro-electro-mechanical (MEM) translational tabs for enhancing and controlling aerodynamic loading of lifting surfaces mounted near the trailing edge of the wing. One issue created by these devices is that they deploy approximately normal to the surface, and require actuators that are normal to the wing surface, thus limiting their proximity to the wing trailing edge. Schwetzler, et al. (U.S. Pat. No. 6,641,089) teach a movable auxiliary flap that is arranged on a trailing edge of a wing, such that the flap rotates relative to the wing, to move up and down. An undesirable effect is created in the transition states of these flaps, where the state of the flap being perpendicular to the wing surface is not instantaneous and is undesirable.

What is needed is an alternative to conventional aerodynamic control surfaces that are capable of actuation over a wide frequency range, allowing for control of high frequency structural modes as will as low frequency rigid body modes. Further, such control devices are needed that actively control the aeroelastic response without any structural weight penalty and that are simple to command to discrete states without need for a position feedback mechanism. Such a device should be useful for aircraft flight control, turbine engines, helicopters, and wind turbines, thus providing an overall control system that is more robust and fault tolerant than conventional systems.

SUMMARY OF THE INVENTION

The present invention provides alternatives to conventional aerodynamic control surfaces that are capable of actuation over a wide frequency range allowing for control of high frequency structural modes as well as low frequency rigid body modes. Aspects of the invention include mechanisms for moving small control surfaces which then influence the aerodynamic flow field. Application areas include aircraft flight control, turbine engines, helicopters, and wind turbines. High-altitude, long endurance air vehicles such as the AeroVironment Helios or the Northrop Grumman Global Hawk may benefit from the devices according to the current invention. These types of vehicles experience significant aeroelastic effects due to their high aspect ratio, flexible wings. The typical solution to these challenges involves stiffening the structure, which adds weight to the vehicle. As an attractive alternative, devices according to the present invention could actively control the aeroelastic response without any structural weight penalty. Other types of flight vehicles, including commercial airplanes, may also utilize devices of the present invention to modify the aerodynamics in a beneficial manner.

The miniature trailing edge devices are an order of magnitude smaller than conventional control surfaces while maintaining comparable control effectiveness. This is accomplished through higher deflection and favorable positioning. The small size of the devices translates into low inertia, enabling high frequency actuation at very low power consumption.

A typical application also involves a large number of devices. The individual devices are very simple and can be commanded to discrete states, such as up, down, or neutral. The choice of discrete actuation eliminates the need for a position feedback mechanism, further simplifying the device. Several of the designs described can also support actuation to intermediate states which would then be achieved using position feedback. With large numbers of devices and with each having a smaller influence, the overall control system becomes more robust and fault tolerant than a conventional system. Moreover, simple devices according to the present invention can provide significant manufacturing cost reduction, especially in cases where many devices are required.

In one embodiment of the invention a trailing edge aerodynamic control effector has a housing shaped to conform to a trailing edge of an aerodynamic shape and is integrated to the trailing edge of the aerodynamic shape. A bucket shaped effector plate has a generally rectangular effector plate has a length, a width and a thickness and a pair of arms attached to the effector plate ends at a first arm end and the arms are pivotably connected about an axis in the housing at a second arm end. The axis is parallel to the trailing edge. This embodiment further includes a pair of actuators in the housing that act to position the arms in a first position, a second position and a third position. When the arms are in the first position the effector plate deflects airflow moving across a top surface of the aerodynamic shape. When the arms are in the second position the effector plate is positioned behind the trailing edge of the aerodynamic shape to not deflect the airflow. When the arms are in the third position the effector plate deflects airflow moving across a bottom surface of the aerodynamic shape. Arm stops are integrated to the housing to limit movement of the arms beyond the first position or beyond the third position.

According the to aspects of this embodiment, the actuators may be DC electric motors, piezo-electric actuators, solenoids or shape memory alloy actuators. Further, the arm stops may have electrical contacts to provide feedback information to the actuators when the arms contact the stops and a reduced power is supplied to the actuator that is sufficient maintain contact with the stops. The first position has a movement range from the second (neutral) position to about the width of the effector plate when positioned in the airflow moving across the airfoil top surface. The third position has a movement range from the second (neutral) position to about the width of the effector plate when positioned in the airflow moving across the airfoil bottom surface.

In another aspect of this embodiment, when the actuators are in an off mode the arms are positioned in the second position using spring actuation, magnetic actuation or electro-magnetic actuation.

In another aspect, the arm second end has a counter balance attached thereto acting against gravitational forces acting on the arm first end.

In another aspect of the invention the effector plate is actuated to any of three states consisting of up, down and neutral. A first pivotable bracket and a second pivotable bracket are independently actuated, where the first bracket has a neutral position and an up position and the second bracket has the neutral position and a down position. The brackets are disposed between the housing and the arms, where the brackets have a bracket housing for pivoting about the axis at a proximal bracket housing end and flanges at a bracket housing distal end. When the first bracket is in the up position and the second bracket is in the neutral position, the effector plate is in the up position. When the first bracket is in the neutral position and the second bracket is in the down position, the effector is in the down position. When the first bracket is in the neutral position and the second bracket is in the neutral position, the effector is in the neutral position.

In another embodiment, the trailing edge aerodynamic control effector has a housing shaped to conform to a trailing edge of an aerodynamic shape and integrated to the trailing edge of the aerodynamic shape. The housing has a top cavity and a bottom cavity and a pair of actuators to independently move a pair of effector plates that are disposed to pivot at one end about an axis, wherein a first effector plate recesses in said top cavity and a second effector plate recesses in said bottom cavity and said axis is parallel and proximal to said trailing edge. The control effector in this embodiment may have actuators such as DC electric motors, piezo-electric actuators, solenoids or shape memory alloy actuators.

In another embodiment of the invention a trailing edge aerodynamic control effector has a housing shaped to conform to a trailing edge of an aerodynamic shape and integrated to the trailing edge of the aerodynamic shape. The housing houses an actuator for moving an effector plate about an axis that is parallel to a cord line of the aerodynamic shape, where the effector plate has a first position and a second position. The actuator may be DC electric motors, piezo-electric actuators, solenoids or shape memory alloy actuators. When in the first position the effector plate deflects airflow moving across a surface of the aerodynamic shape and when in the second position the effector plate is positioned behind the trailing edge of the aerodynamic shape to not deflect the airflow. The effector plate may be configured to deflect airflow across the top surface or the bottom surface of the aerodynamic shape.

BRIEF DESCRIPTION OF THE FIGURES

The objectives and advantages of the present invention will be understood by reading the following detailed description in conjunction with the drawing, in which.

DETAILED DESCRIPTION OF THE INVENTION

Although the following detailed description contains many specifics for the purposes of illustration, anyone of ordinary skill in the art will readily appreciate that many variations and alterations to the following exemplary details are within the scope of the invention. Accordingly, the following preferred embodiment of the invention is set forth without any loss of generality to, and without imposing limitations upon, the claimed invention.

Figure 1:
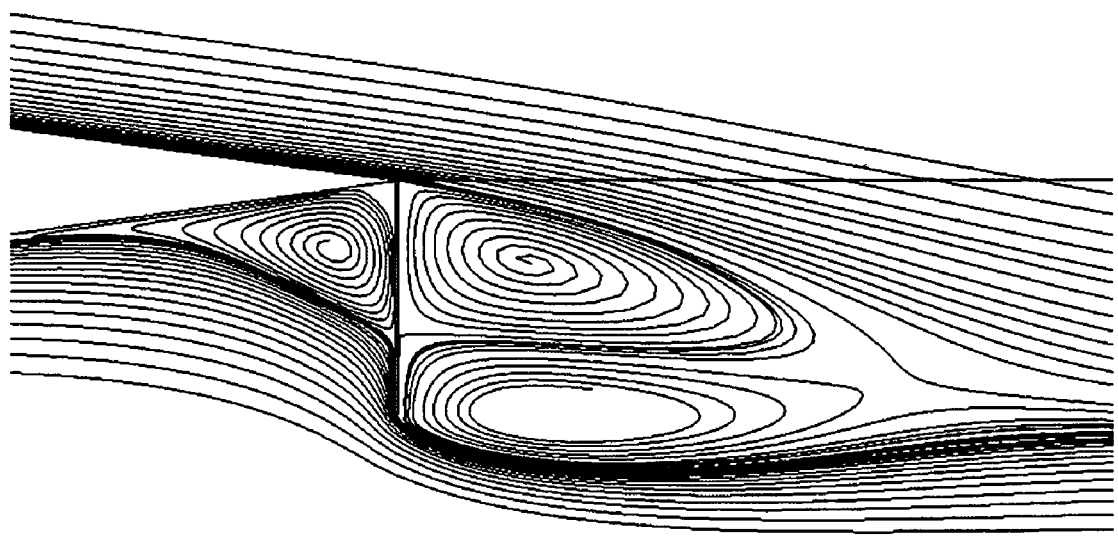
FIG. 1 shows computed streamlines for a wing section having a miniature control surface according to the present invention.

Miniature trailing edge (MiTE) devices have been shown to be effective in generating aerodynamic forces. In two-dimensional flow, a 1.5% chord vertically-deflected device can change the section lift coefficient, $C_1$, as much as 0.33. This is equivalent to deflecting a 10% chord conventional flap 15 degrees. FIG. 1 depicts streamlines on MiTE deflected at 90-degrees that shows the stagnation pressure map and the streamline for an NACA0012 airfoil with a 1.5% flap. As shown, the separated region behind the trailing edge is mainly responsible for the alteration of the aerodynamic force. This is achieved by effectively changing the Kutta condition.

Figure 2:
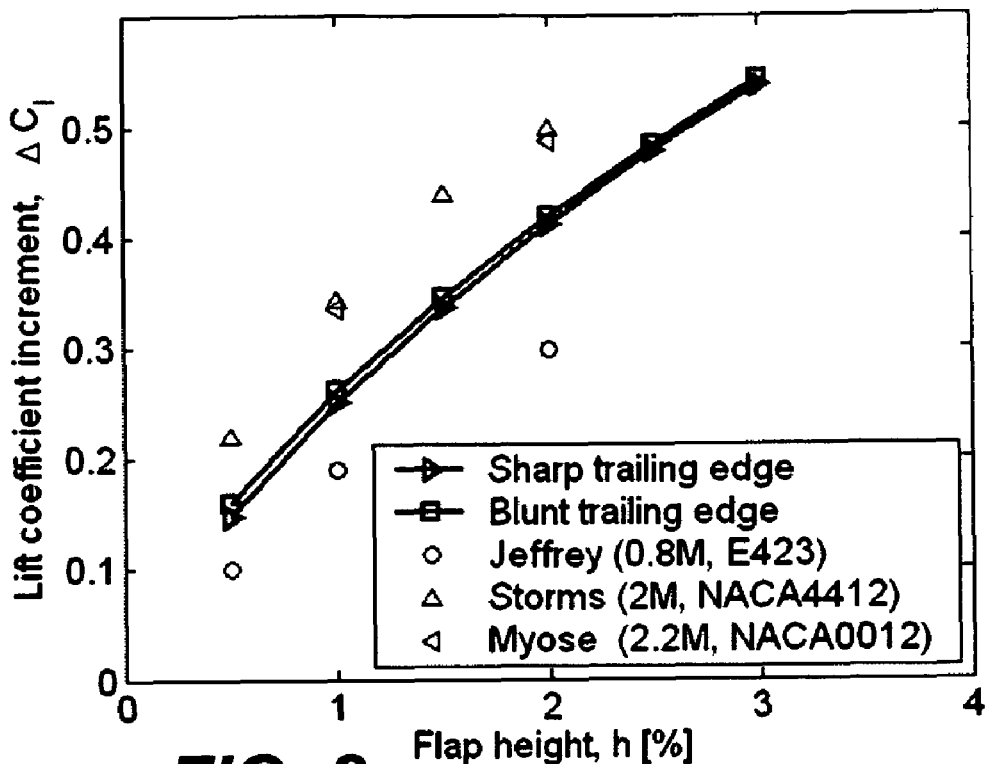
FIG. 2 shows the lift coefficient increment vs. flap height for several examples according to the present invention.

Computational and experimental results show that the increment in $C_1$ due to the miniature trailing edge devices increases almost linearly with respect to its height, h, as shown on FIG. 2 that depicts the change in lift coefficient with respect to device height. Some variation is observed for different airfoils, Reynolds numbers, and angles of attack.

Figure 3:
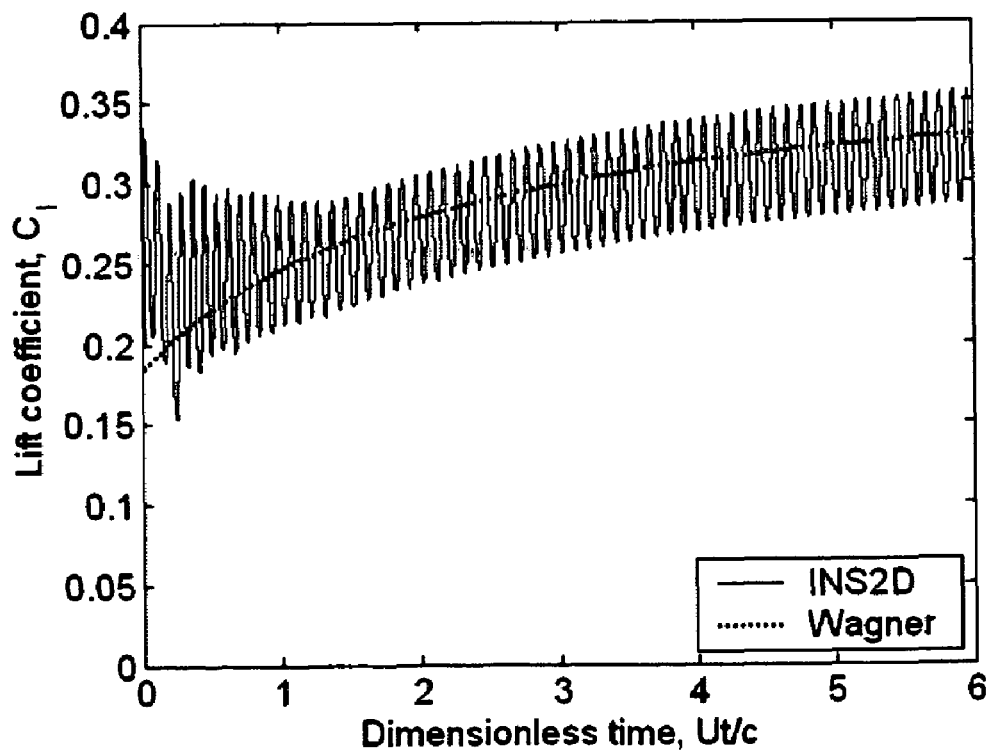
FIG. 3 shows the time-dependent lift coefficient for a wing having a miniature control surface according to the present invention.

Time accurate computational results are shown in FIG. 3, depicting the history of lift coefficient for an impulsively started airfoil with a miniature trailing edge actuator fully deflected. These results reveal that the aerodynamic delay is small, which makes the device suitable for high frequency active control. Extremely high frequency oscillation is observed due to vortex shedding, but since this frequency is typically an order of magnitude higher than the natural frequency of the structure, it does not have significant effect on the applications according to the current invention.

Figure 4:
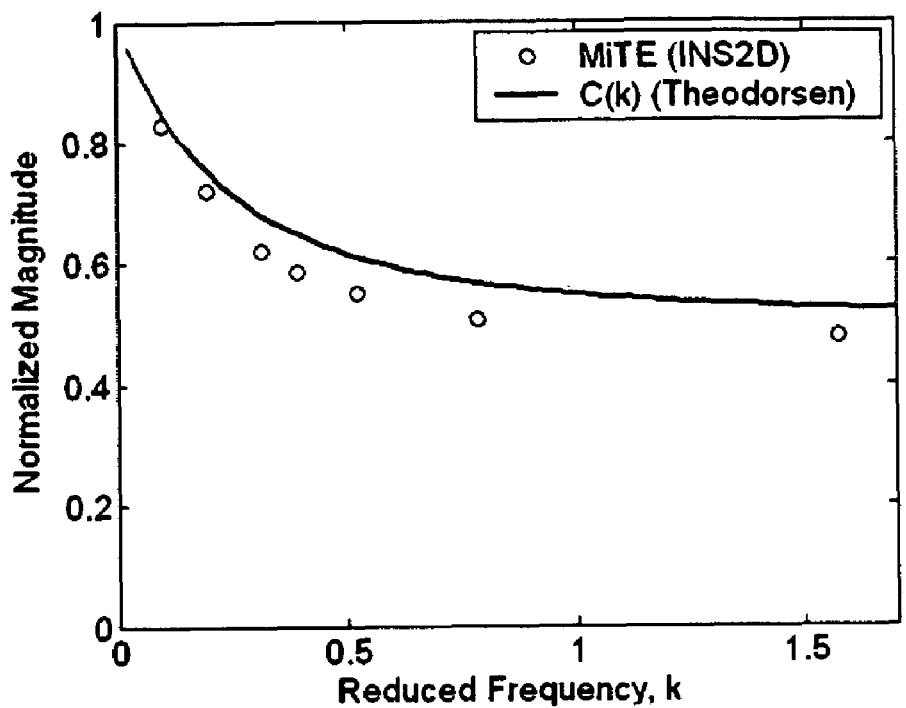
FIGS. 4a-4b show magnitude and phase response for a miniature effector according to the present invention.
Figure 4:
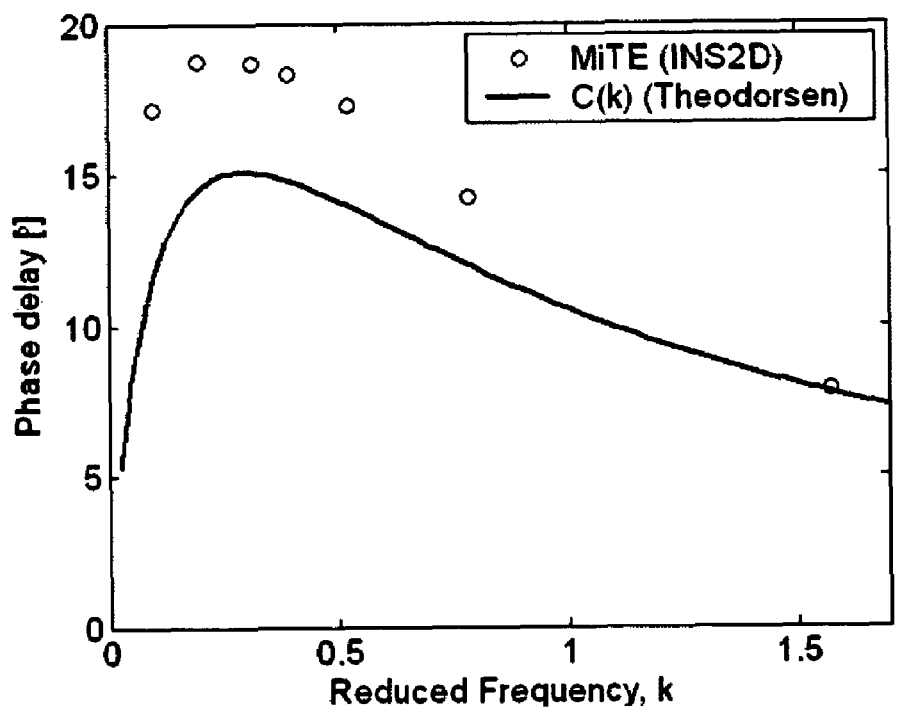

FIGS. 4a-4b show the magnitude and phase of the section lift coefficient versus device actuation frequency. The computation results are compared with linear theoretical results.

Figure 5:
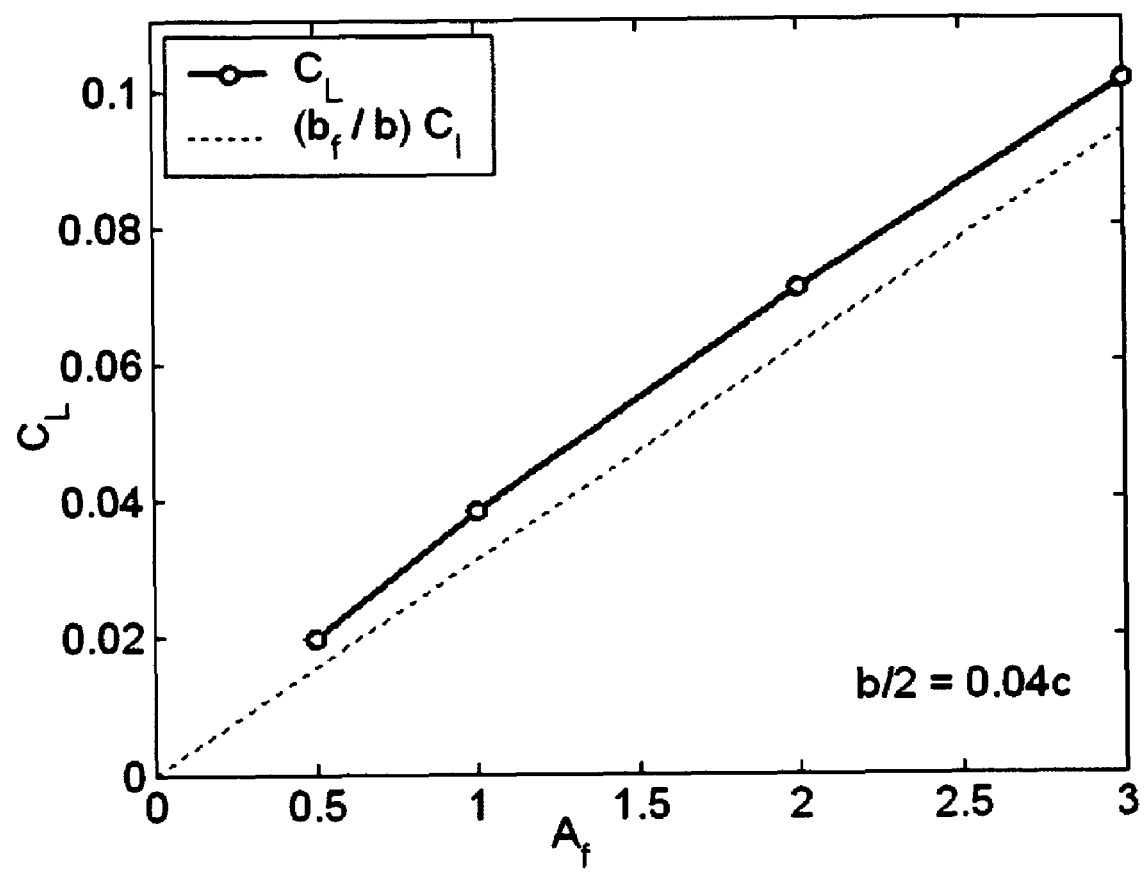
FIG. 5 shows the dependence of total lift on the spanwise extent of miniature control surfaces according to the present invention.

The good correlation indicates that linear theory can be used for designing control systems that use the effectors. Three dimensional computational analyses and wind tunnel tests were performed to examine the influence of the spanwise extent of the devices. The results shown in FIG. 5 indicate that the total lift coefficient varies nearly linearly with the spanwise extent of the devices, even for low aspect ratio flaps.

Computational and experimental results have shown that the MiTE devices are effective in generating aerodynamic forces. Further, the effectiveness scales almost linearly with respect to the height of the device and also the spanwise length. The dynamic characteristics are similar to conventional flaps which allows simplified tools to be used for control design.

Three different embodiments for miniature trailing edge control effector are provided. These embodiments include a bucket type, a flip-up type, and rotating type. The devices of the present invention include approaches for accomplishing high bandwidth deflection at the trailing edge while maintaining a clean aerodynamic configuration when not deflected. Each device presented moves a surface at the trailing edge of an aerodynamic shape. The differences are in the mechanics of the movement and in the size and shape of the surface deflected. The devices are also unique in the manner in which multiple copies can be located adjacent to one another. All the designs can be actuated using a simple direct current (DC) motor although other actuation technologies are also suitable. These include, for example, solenoids, piezoelectric actuators, and shape memory alloy actuators. A key aspect of the invention is the kinematics of movement for the devices along with the improved aerodynamic efficiency.

Figure 6:
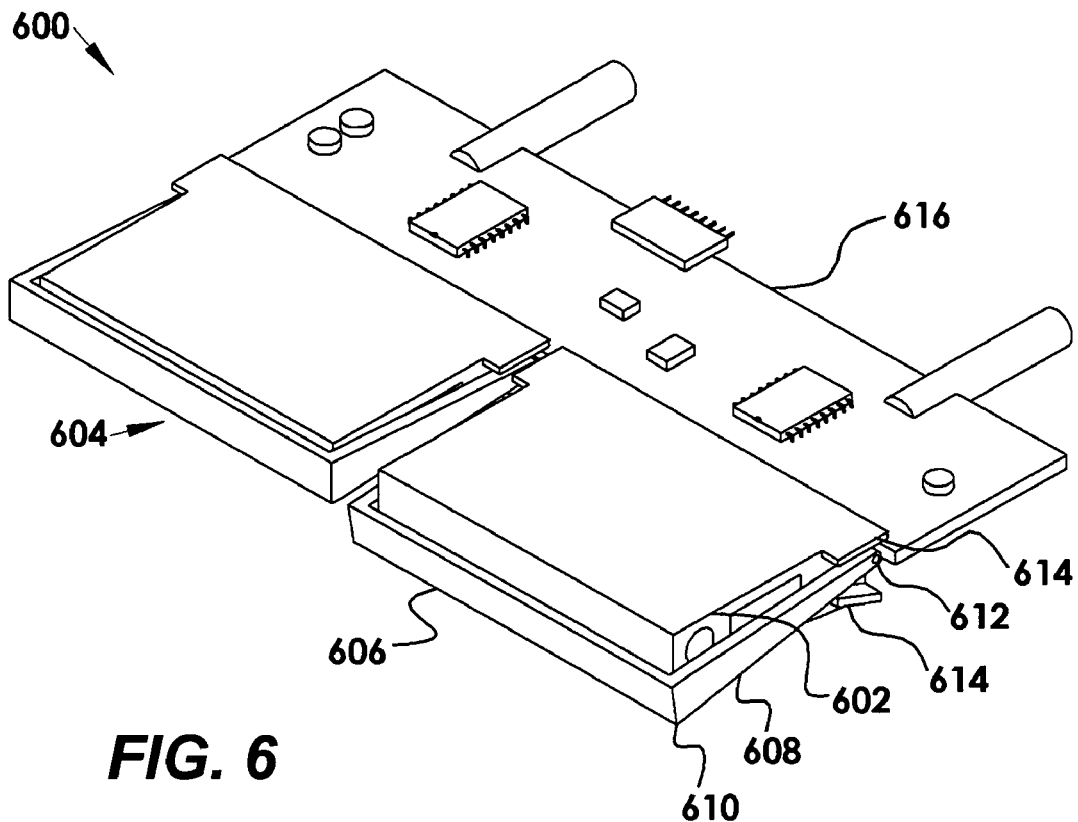
FIG. 6 shows a perspective view of one embodiment of the invention with two exemplary bucket-type devices.
Figure 7:
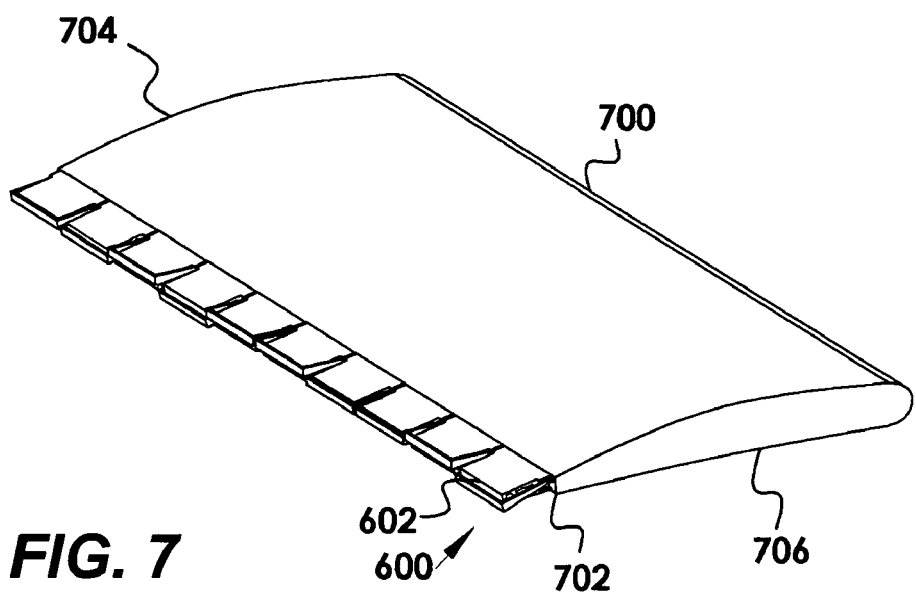
FIG. 7 shows a perspective view of a wing having multiple bucket-type devices on its trailing edge.

An exemplary bucket-type MiTE 600 is depicted in FIGS. 6 and 7, where depicted in FIG. 6 are two copies of the this embodiment configured in a side by side arrangement. In this embodiment of the invention each control effector has a housing 602 shaped to conform to a an aerodynamic shape 700 (see FIG. 7), and in particular to conform to the trailing edge 702, where the housing 602 is integrated to the trailing edge 702 of the aerodynamic shape 700. Each housing 602 holds a moveable bucket control effector 604 having a generally rectangular effector plate 606 having a length, a width and a thickness. A pair of arms 608 are attached to the ends of the effector plate 606 at an arm first end 610, where the arms 608 are pivotably connected about an axis (not shown) in the housing 602 at an arm second end 612. The axis is parallel to the trailing edge 702 of the aerodynamic shape (see FIG. 7). This embodiment further includes a pair of actuators (not shown) in the housing 602 that act to position the arms 608 in a first position, a second position and a third position. When the arms 608 are in the first position the effector plate 606 deflects airflow moving across a top surface 702 of the aerodynamic shape 700 (see FIG. 7). When the arms 608 are in the second position the effector plate 606 is positioned in a neutral behind the trailing edge of the aerodynamic shape to not deflect the airflow, as depicted in the far position of FIG. 6. When the arms 608 are in the third position the effector plate 606 deflects airflow moving across a bottom surface 704 of the aerodynamic shape 700 (depicted in the near position of FIG. 6). Arm stops 614 (see FIG. 6) are integrated to the housing 602 to limit movement of the arms beyond the first position or beyond the third position. For the example of FIG. 6, it is designed to fit into the trailing edge of a flight demonstrator wing.

According to the aspects of this embodiment, the actuators (not sown) may be DC electric motors, piezo-electric actuators, solenoids or shape memory alloy actuators, where the effectors are commanded an powered by control electronics 616. Another potential improvement involves the addition of contacts (not shown) in the stops 614 to reduce the power consumption. When the arm 608 contacts the stops 614 a circuit is closed which can then be used to reduce the supplied power to the actuator. When the contact is lost, indicating the arm 608 is not in the desired position, the supplied power can be increased.

Figure 8:
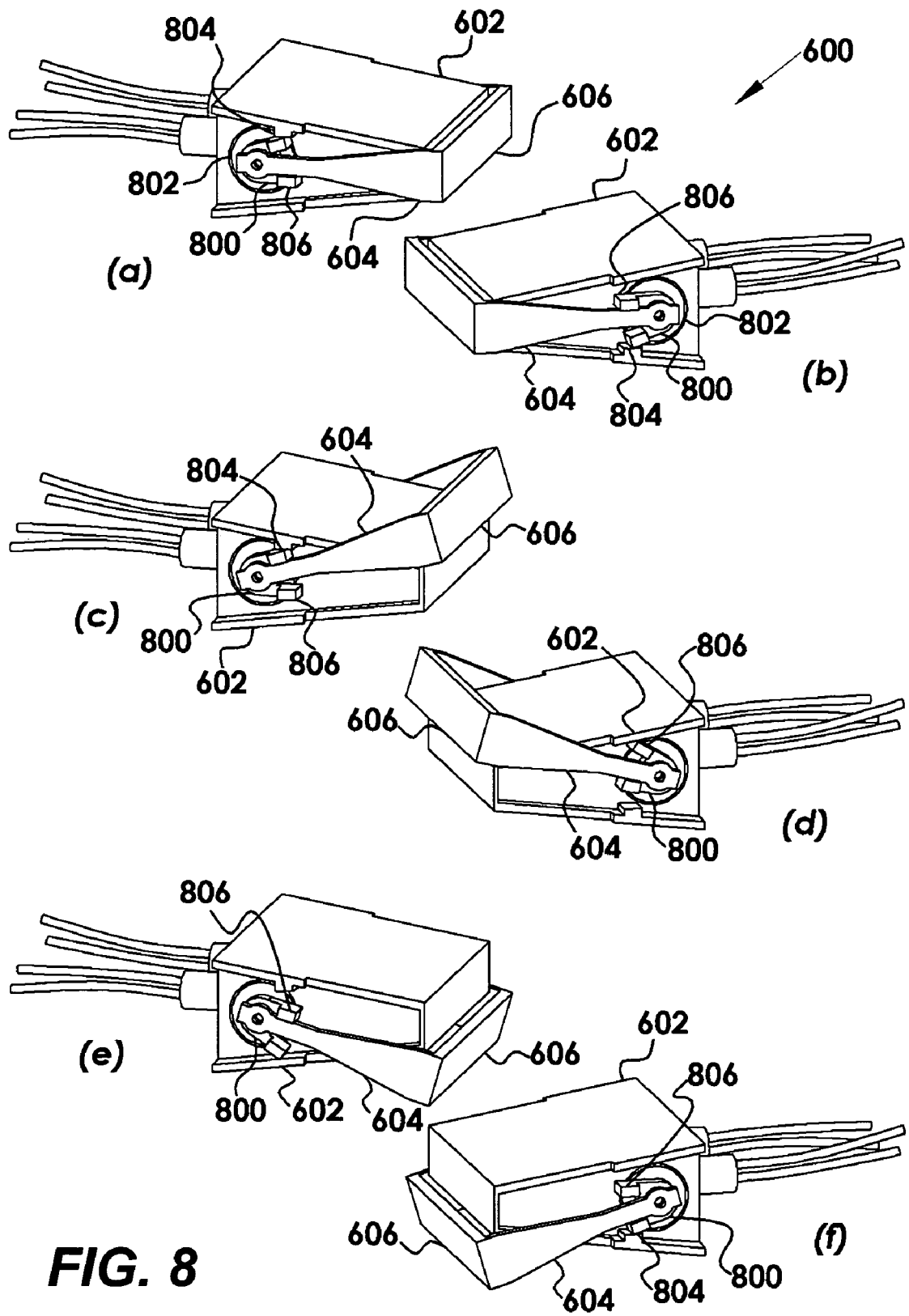
FIGS. 8a-8f show perspective views of an embodiment of the invention including a bucket-type device with brackets to provide a commanded up, down and neutral.
Figure 9:
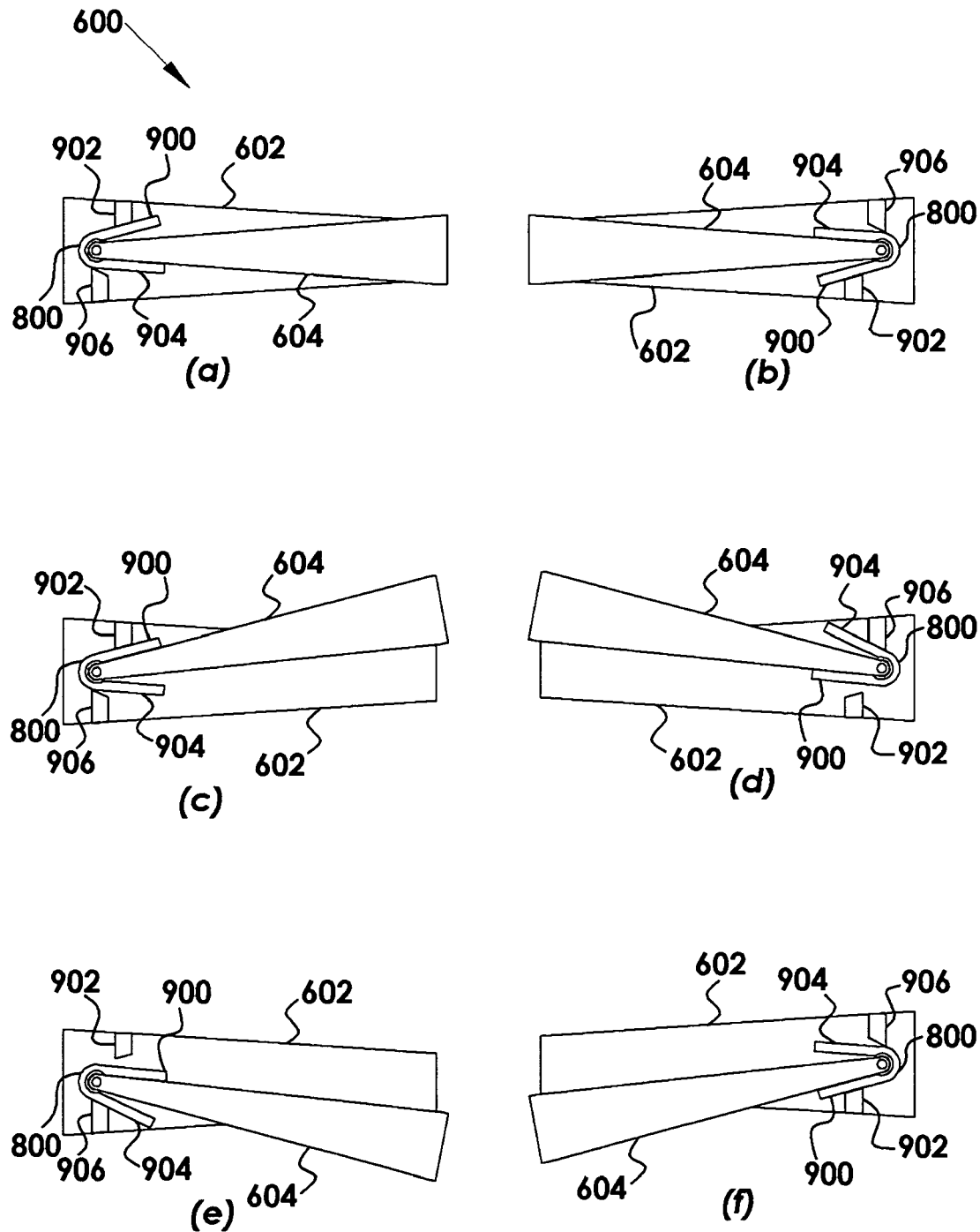
FIGS. 9a-9f show planar schematic views of operation of the embodiment of FIG. 8 using bracket stops.

Depicted in FIGS. 7, 8, and 9, the first position has a movement range from the second (neutral) position to about the width of the effector plate 606 when positioned in the airflow moving across the airfoil top surface. The third position has a movement range from the second (neutral) position to about the width of the effector plate 606 when positioned in the airflow moving across the airfoil bottom surface.

Each actuator drives one arm 608 of the device and their action is in unison. Stops 614 built into the housing 602 constrain the allowable movement of the arm 608. The near device in FIG. 6 is shown in the down state while the far device is in the neutral state. A key advantage of the invention is the ability to provide a commanded neutral position. Two options for providing a neutral position are available when actuators such as DC motors are used. First, devices can be used in pairs with one moving neutral-down and the other neutral-up. Second, the devices can deflect up-down and then have the neutral achieved using a spring or magnet. The latter requires that the actuators have an "off" condition in which they exert no torque. These advantages are further described in FIGS. 8 and 9.

As there is almost no friction when rotating the bucket 604, the bucket type system 600 can achieve very high bandwidth. Also the motion of the effector plate 606 is nearly perpendicular to the flow direction, requiring minimal hinge moment. Many variations on the device are possible. The length of the arm 608 can be varied to further increase the bandwidth with some loss in aerodynamic effectiveness. The arm 608 can be counterbalanced to ensure that it is unaffected by gravitational forces.

FIG. 8a-8f show a preferred embodiment of the bucket-type MiTE 600. In this embodiment, the motion of arms 604 with respect to housing 602 is controlled via bracket housings 800 having bracket flanges 806. This embodiment provides positive command of all three device states (i.e., up, down, and neutral), which is a key advantage of the invention. This design also uses two DC motors 802, one for each bracket 800 located on each side of the housing 602. Again, an alternate to DC motors could be used. Each bracket 800 can move to two positions, again limited by the geometry of the housing 602. The combination of these two positions allows all three states of the arm 604 to be commanded, as shown in FIGS. 8a-8f. The drawings are arranged in pairs depicting each side of the invention in each of the three states. FIGS. 8a and 8b depict the apparatus in the neutral position, where FIG. 8a shows the bracket 800 in an up position abutting a stop 804 integrated to the housing 602, and FIG. 8b shows the opposite bracket 800 in a down position abutting the housing 602. Here, a forced neutral position is demonstrated. The brackets 800 are disposed between the housing 602 and the arms 604, where the brackets 800 pivot about the axis at a proximal bracket end and the flanges 806 are located at a bracket housing 800 distal end. The flanges 806 act on the arms 604 to create the forced states. FIGS. 8c and 8d show the bucket type MiTE 600 having the effector plate 606 and arms 604 in an up position, where FIG. 8c shows the bracket 800 in the up position, and FIG. 8d shows the opposite bracket 800 also in the up position. FIGS. 8e and 8f show the bucket type MiTE 600 having the effector plate 606 and arms 604 in a down position, where FIG. 8e shows the bracket 800 in the down position, and FIG.

8*d* shows the opposite bracket 800 also in the down position. It should be apparent that sensors for providing position feedback information may be integrated to the stops 804 or to the housing 602.

FIGS. 9*a*-9*f* depict a schematic version of the bucket type MiTE 600 in the neutral, up and down positions of FIG. 8, as described having the housing 602 with stops 804 for limiting both the up and down positions of the bracket 800. FIGS. 9*a* and 9*b* depict the effector arms 604 in a forced neutral position, where the bracket 800 is depicted in FIG. 9*a* in the up position and a first bracket arm 900 abuts a first stop 902 positioned above the effector arm 604, where a second bracket arm 904 abuts the bottom surface of the effector arm 604. Here, the first bracket arm 900 and the second bracket arm 904 provide a schematic representation of the flanges 806 depicted in FIG. 8. The opposing bracket 800 is depicted in FIG. 9*b* in the down position with the first bracket arm 900 abutting the first stop 902 positioned below the effector arm 604, where the second bracket arm 904 abuts the top surface of the effector arm 604. Here, a forced neutral position is illustrated in the combined drawings.

FIGS. 9*c* and 9*d* depict the bucket type MiTE 600 having the effector arms 604 in an up position, where the bracket 800 is depicted in FIG. 9*c* in the up position and the first bracket arm 900 is abutting the first stop 902 positioned above the effector arm 604. The opposing bracket 800 is depicted in FIG. 9*d* in the up position with a second bracket arm 904 abutting a second stop 906 positioned above the effector arm 604, whereby in FIG. 9*c* the first bracket arm 900 abuts the top surface of the effector arm 664, and in FIG. 9*d* the first bracket arm 900 abuts the bottom surface of the effector arm 604, creating a forced up position. The first stop 902 allows for a smaller rotation of the bracket 800 than the second stop 908.

FIGS. 9*e* and 9*f* depict the bucket type MiTE 600 having the effector arms 604 in a down position, where the bracket 800 is depicted in FIG. 9*e* in the down position and the second bracket arm 904 is abutting the second stop 906 positioned below the effector arm 604. The opposing bracket 800 is depicted in FIG. 9*f* in the down position with the first bracket arm 900 abutting the first stop 902 positioned below the effector arm 604, whereby in FIG. 9*e* the first bracket arm 900 abuts the top surface of the effector arm 604 and in FIG. 9*f* the first bracket arm 900 abuts the bottom surface of the effector arm 604, creating a forced down position.

Figure 10:
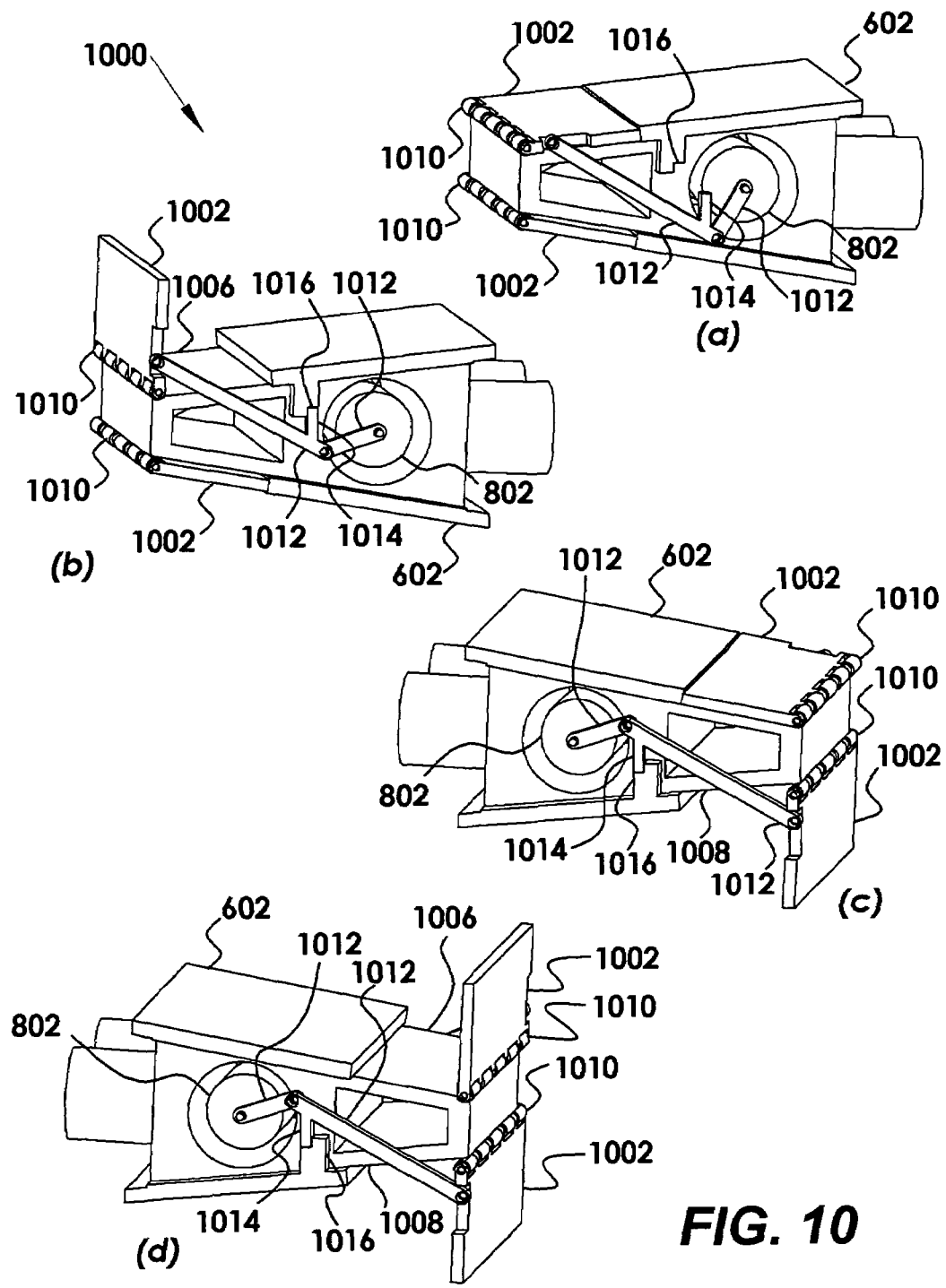
FIGS. 10a-10d show perspective views of an embodiment of the invention including an exemplary flip-up type device.

FIGS. 10*a*-10*d* show an example of the flip-up type MiTE device 1000. The flip-up device 1000 has the advantage that it can be applied to airfoils with sharp trailing edges. This minimizes the drag penalty associated with a blunt trailing edge. In addition the size of the deflected surface is not related to the thickness of the trailing edge. Two small flip up effector plates 1002, hinged at the wing trailing edge 702 (see FIG. 7), can flip up from both the upper wing surface 704 and lower wing surface 706 of the wing 700 (depicted in FIG. 7 for example). Since the two plates 1002 operate independently, there exist four states. FIG. 10*a* depicts the flip-up type MiTE device 1000 in a neutral state, FIG. 10*b* depicts an up state, FIG. 10*c* depicts a down state, and FIG. 10*d* depicts brake state. The two plates 1002 recess respectively in a top cavity 1006 and a bottom cavity 1008 of the housing 602.

In these figures, a pair of actuators 802 operate independently to move the effector plates 1002 that are disposed to pivot at one end about an axis 1010 that is parallel and proximal to the trailing edge 702. The actuators 802 in these drawings are depicted as DC electric motors, however piezo-electric actuators, solenoids or shape memory alloy actuators may also be used. The effector plates 1002 and 1004 are shown connected to the actuators by linkage arms 1012 having a post 1014 that moves to abut a post stop 1016 for limiting the rotation of the effector plates 1002 and 1004 to a desired position, such as vertical.

In addition to the typical three states—up, down, and neutral—this configuration has a brake state which increases the drag without changing the lift. The brake state, depicted in FIG. 10*d*, can be effectively used for the yaw control of a tailless aircraft such as a flying wing. The basic version of the flip-up design has been prototyped, with DC motor actuation. As for the bucket type device, any other method of actuating the control surfaces can also be used.

Figure 11:
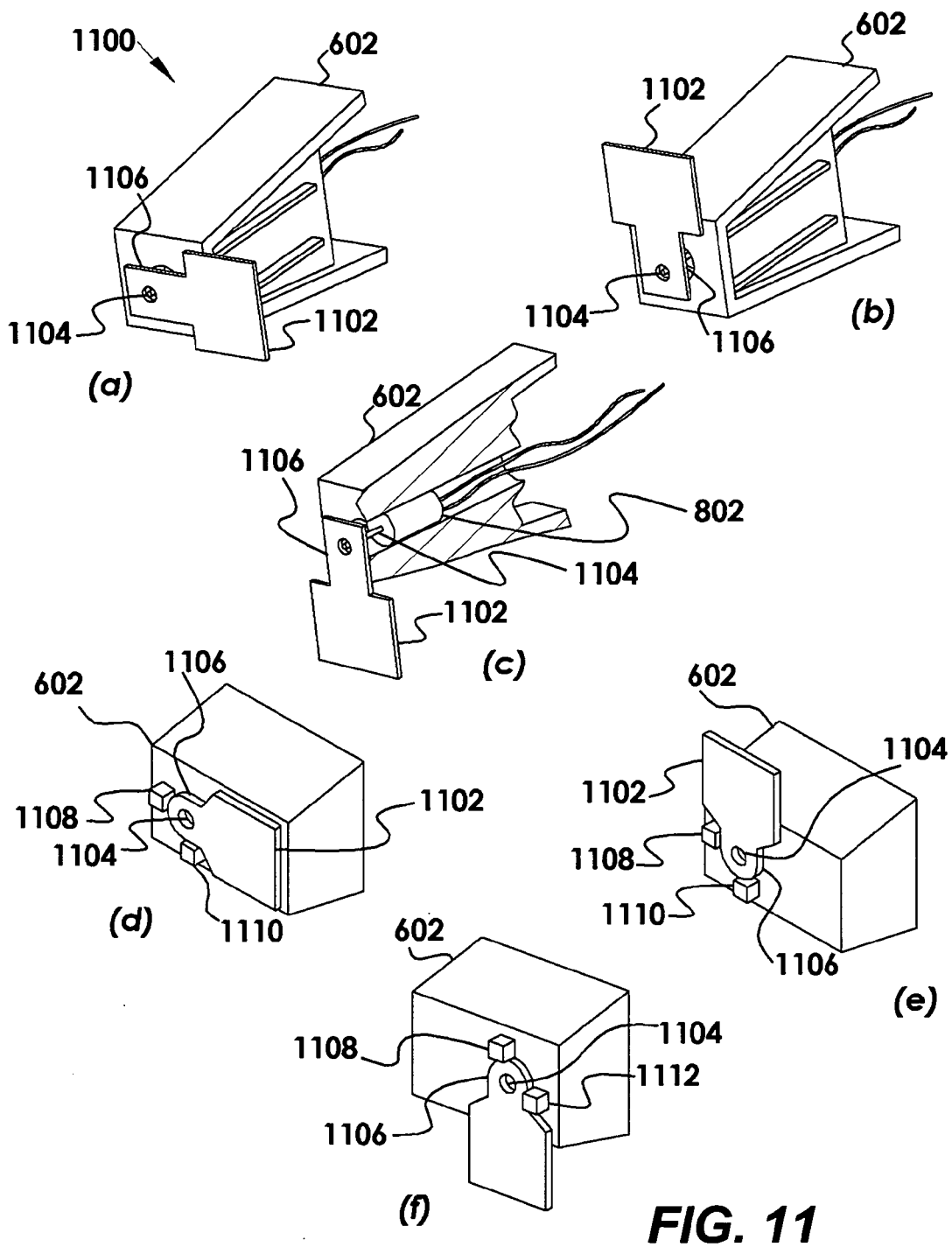
FIGS. 11a-11f show perspective views of an embodiment of the invention including an exemplary rotating type device.

FIGS. 11*a*-11*f* show some examples of the rotating type MiTE device 1100. In this version, a small effector plate 1102 rotates about an axis 1104 that is parallel to the wing chord line (not shown). Each actuator has either of the two states: up-neutral or down-neutral. These embodiments are the simplest of all three, and can achieve the highest bandwidth and lowest hinge moment. These design are especially suited to swept wings. For the devices of FIGS. 11*a*-11*f*, the maximum spanwise extent of the deflected surface is equal to the trailing edge thickness. Instead the actuator 802 moving the effector plate 1102, the actuator 802 now rotates an axle 1104 attached to an arm 1106 that is attached to the effector plate 1102. FIG. 11*a* depicts the effector plate 1102 in a neutral position, FIG. 11*b* depicts the effector plate 1102 in an up position, and FIG. 11*c* depicts the effector plate 1102 in a down position. Further, FIG. 11*c* is depicted with a housing 602 cutaway to reveal an actuator 802 with an axle 1104 attached to the arm 1106. FIGS. 11*d*-11*f* depict a variation on the rotating type MiTE device 1100 that have an up-position stop 1108 a neutral stop 1110 and a down-position stop 1112.

The devices of the invention provide various advantages. For the bucket-type MiTE 600, there are four significant advantages. First, no portion of the device, in particular related to the actuation mechanism, disturbs the flow field. This is especially the case when the moveable portion is stowed. The result is a much cleaner aerodynamic surface. Second, the device can be actuated in either direction, up or down. Neutral can be imposed through stops inserted to limit the motion or via a passive centering mechanism such as a spring. The third benefit relates to failure of the mechanism, in which case the bucket design will cause the moveable surface to drift towards neutral under the action of aerodynamic forces. Fourth, the bucket-type device including brackets provides three commanded states: up, neutral, and down. With other conventional devices, the neutral state is often not commanded but rather accomplished via a centering mechanism that drifts to neutral, such as with a spring. This approach can result in unreliable and/or inconsistent neutral positioning of the control surface. Conventional commanded-neutral approaches tend to require devices to be oriented in pairs with one deflecting neutral-up, the other neutral-down. This results in loss of effective control effort, which is advantageously avoided by the bracket type device.

The flip-up type MiTE device 1000 addresses a key deficiency of many conventional approaches: the requirement for a blunt trailing edge. A second benefit is the ability to simply and quickly increase the size of the moveable portion of the surface. Conventionally the size of the moveable portion is typically limited to the thickness of the trailing edge or the location of the hingeline relative to the trailing edge.

The rotating type MiTE device 1100 provides the high bandwidth and a low hinge moment. These design are especially suited to swept wings.

The present invention has now been described in accordance with several exemplary embodiments, which are intended to be illustrative in all aspects, rather than restrictive.

Thus, the present invention is capable of many variations in detailed implementation, which may be derived from the description contained herein by a person of ordinary skill in the art.

What is claimed is:

1. A trailing edge aerodynamic control effector comprising:
   a. a housing shaped to conform to a trailing edge of an aerodynamic shape and integrated to said trailing edge of said aerodynamic shape;
   b. a generally rectangular effector plate having effector plate ends, where said effector plate comprises a length, a width and a thickness;
   c. a pair of arms attached to said effector plate ends at a first arm end and said arms are pivotably connected about an axis in said housing at a second arm end, wherein said axis is parallel to said trailing edge;
   d. a pair of actuators in said housing act to position said arms in a first position, a second position and a third position, wherein when in said first position said effector plate deflects airflow moving across a top surface of said aerodynamic shape and when in said second position said effector plate is positioned behind said trailing edge of said aerodynamic shape to not deflect said airflow and when in said third position said effector plate deflects airflow moving across a bottom surface of said aerodynamic shape; and
   e. arm stops integrated to said housing to limit movement of said arms beyond said first position or beyond said third position.

2. The control effector of claim 1, wherein said actuator comprises DC electric motors, piezo-electric actuators, solenoids or shape memory alloy actuators.

3. The control effector of claim 1, wherein said arm stops comprise electrical contacts to provide feedback information to said actuators when said arms contact said stops and a reduced power is supplied to said actuator that is sufficient maintain said contact.

4. The control effector of claim 1, wherein said first position comprises a movement range from said second position to about said width of said effector plate when positioned in said airflow moving across said airfoil top surface.

5. The control effector of claim 1, wherein said third position comprises a movement range from said second position to about said width of said effector plate when positioned in said airflow moving across said airfoil bottom surface.

6. The control effector of claim 1, wherein when said actuators are in an off mode said arms are positioned in said second position using spring actuation, magnetic actuation or electromagnetic actuation.

7. The control effector of claim 1, wherein said arm second end has a counter balance attached thereto acting against gravitational forces acting on said arm first end.

8. The control effector of claim 1, wherein said effector plate is actuated to any of three states consisting of up, down and neutral;
   wherein a first pivotable bracket and a second pivotable bracket are independently actuated, whereby said first bracket has a neutral position and an up position and said second bracket has said neutral position and a down position;
   wherein said brackets are disposed between said housing and said arms, whereby said brackets have a bracket housing for pivoting about said axis at a proximal bracket housing end and flanges at a bracket housing distal end; and
   wherein when said first bracket is in said up position and said second bracket is in said neutral position said effector plate is in said up position and when said first bracket is in said neutral position and said second bracket is in said down position said effector is said down position and when said first bracket is in said neutral position and said second bracket is in said neutral position said effector is in said neutral position.

* * * * *